United States Patent [19]

Rasmussen

[11] Patent Number: 4,755,113
[45] Date of Patent: Jul. 5, 1988

[54] SLEEVE PUMP

[75] Inventor: Robert Rasmussen, Buffalo, Minn.

[73] Assignee: Progressive Assembly Machine Co., Inc., Plymouth, Minn.

[21] Appl. No.: 33,440

[22] Filed: Apr. 1, 1987

[51] Int. Cl.$^4$ .............................................. F04B 21/06
[52] U.S. Cl. ..................................... 417/518; 417/469
[58] Field of Search ............... 417/518, 457, 560, 467; 222/380, 381

[56]     References Cited
U.S. PATENT DOCUMENTS

| 287,053 | 10/1883 | Powers | 417/518 X |
| 315,442 | 4/1885 | Powers | 417/518 X |
| 3,837,378 | 9/1974 | Kanki et al. | 417/469 X |
| 4,690,310 | 9/1987 | Rasmussen | 222/309 |

FOREIGN PATENT DOCUMENTS

| 1034981 | 7/1958 | Fed. Rep. of Germany | 417/469 |
| 88281 | 1/1937 | Sweden | 417/518 |

Primary Examiner—Leonard E. Smith
Attorney, Agent, or Firm—Dorsey & Whitney

[57]     ABSTRACT

A compact sleeve pump is provided that is particularly adaptable to fluid dispensing systems having multiple pump groupings. The sleeve pump includes a generally cylindrical valving spool and generally cylindrical dispensing piston, shiftably received within opposite ends of a generally tubular pump sleeve. Sealing members shiftably carried between the valving spool and pump sleeve provide, in conjunction with the selective shifting of the valving spool within the pump sleeve, for the inflow and expulsion of fluid from the pump.

14 Claims, 11 Drawing Sheets

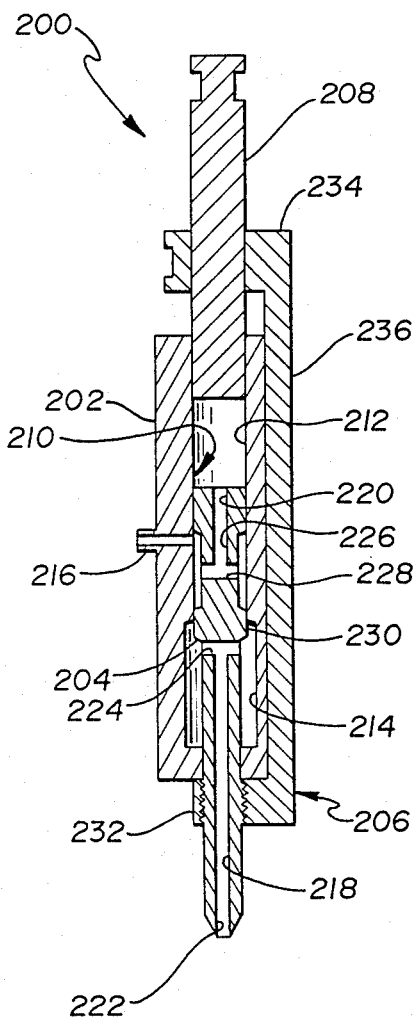
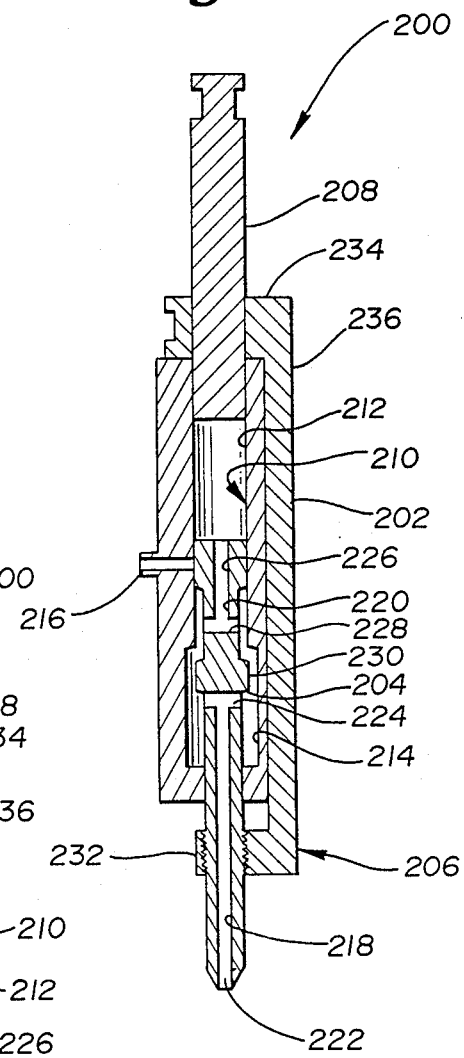
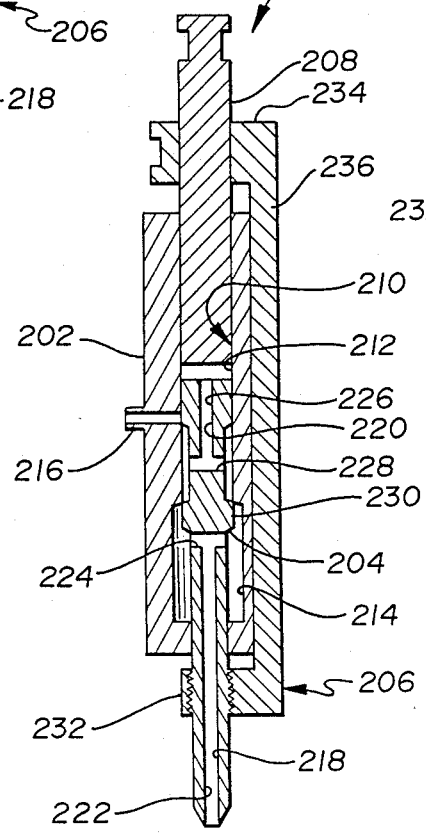
Fig. 4
Fig. 5
Fig. 6

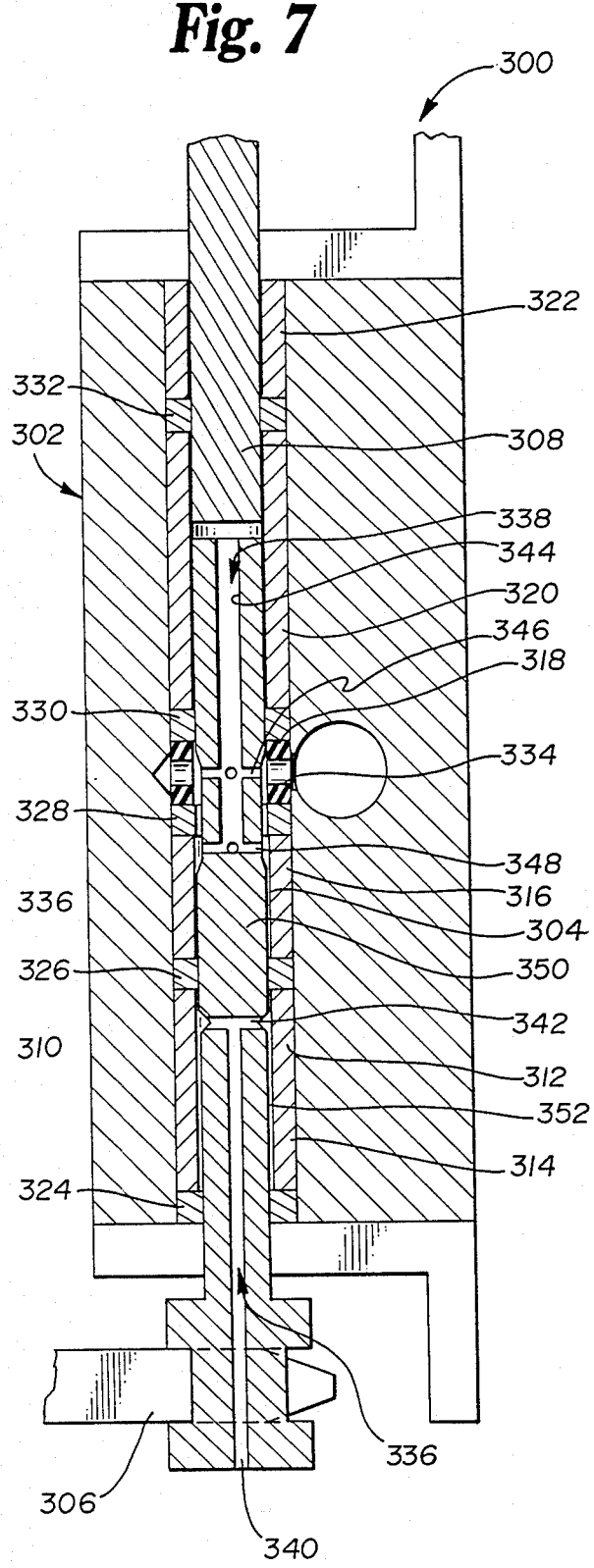
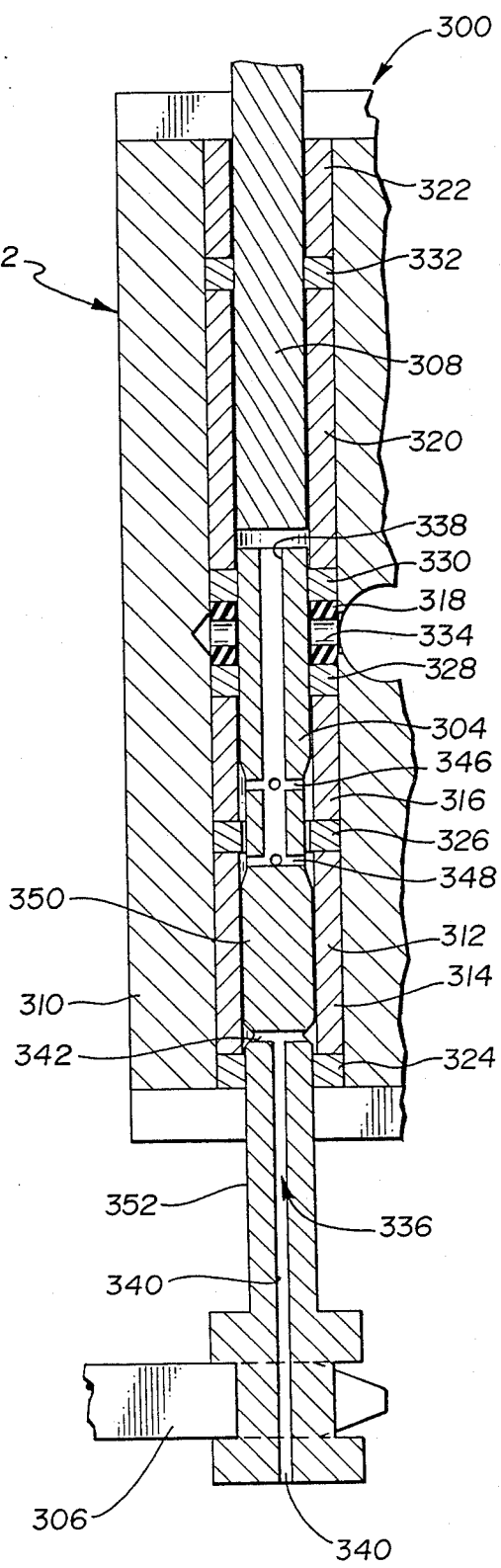

SLEEVE PUMP

TECHNICAL FIELD

The present invention relates to fluid dispensing apparatus. More specifically, it relates to a compactly designed sleeve pump that is particularly adaptable to multiple pump groupings in a single mounting structure for the simultaneous dispensing of fluid in accurately metered amounts from multiple, closely spaced nozzles.

BACKGROUND ART

U.S. Pat. No. 4,690,310 issued Sept. 1, 1987 to the same inventor and assigned to the same assignee as the present application, describes a sleeve pump specially designed to dispense fluids to within ±1% accuracy in metered amounts as small as 0.005 cc. Certain industrial applications would be enhanced by the accurate metered dispensation of fluids as described in the above referenced patent application into closely spaced vials or similar containers. A fluid dispensing apparatus that incorporated the ability to accurately dispense fluids in small metered amounts into a compact pump design applicable to a closely spaced multiple nozzle system would be a decided advantage in such applications.

SUMMARY OF THE INVENTION

The present invention incorporates the ability to accurately dispense fluid in small metered amounts into a compact pump design that allows for high nozzle density in multiple pump groupings. The pump includes a generally cylindrical valving spool carried within one end of a generally tubular pump sleeve. A fluid dispensing piston is received within the other end of the pump sleeve. The valving spool and pump sleeve are selectively shiftable with respect to each other between fluid receiving and fluid expelling configurations that are defined by seal members carried between the valving spool and pump sleeve.

BRIEF DESCRIPTION OF THE DRAWINGS

FIGS. 1Aa and 1Ab combine as shown in FIG. 1A to present a view similar to that shown in FIGS. 1a and 1b, but with the valving spools oriented for fluid entry into respective pump cylinders;

FIG. 4 is a sectional view of an alternative embodiment of the fluid dispensing apparatus in accordance with the present invention;

FIG. 5 is similar to FIG. 4 but with the valving spool in the fluid dispensing position;

FIG. 6 is similar to FIG. 5, but with the fluid actuating piston in the fluid dispensed position;

FIG. 7 is a sectional view of a second alternative embodiment of the fluid dispensing apparatus in accordance with the present invention; and FIG. 8 is similar to FIG. 7 but with the valving spool in the fluid dispensing position and the fluid dispensing piston in the fluid dispensed position.

DETAILED DESCRIPTION OF THE DRAWINGS

Figure 1:
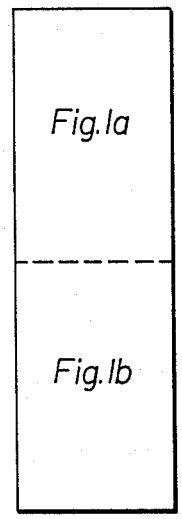
FIGS. 1a and 1b combine as shown in FIG. 1 to present a fragmentary, sectional, front elevation view of a fluid dispensing apparatus in accordance with the present invention oriented in a raised position over fluid containers to which fluid is to be dispensed.

Referring to the drawings, a fluid dispensing apparatus 10 incorporating a plurality of compact pumps 12 is depicted in FIGS. 1a through 3b in conjunction with a plurality of vials 14 to be filled by the apparatus 10. The apparatus 10 broadly includes mounting structure 16 comprising bracket 18 fixedly positioned in height relative to the vials 14, and parallel, adjustable guide rods 20 threadably received by bracket 18. The apparatus 10 further includes pump mounting head 22 shiftably carried relative to mounting structure 18 by pump mounting head carrier 24, and piston cylinder head 26 fixedly carried by bracket 18.

Figure 3A:
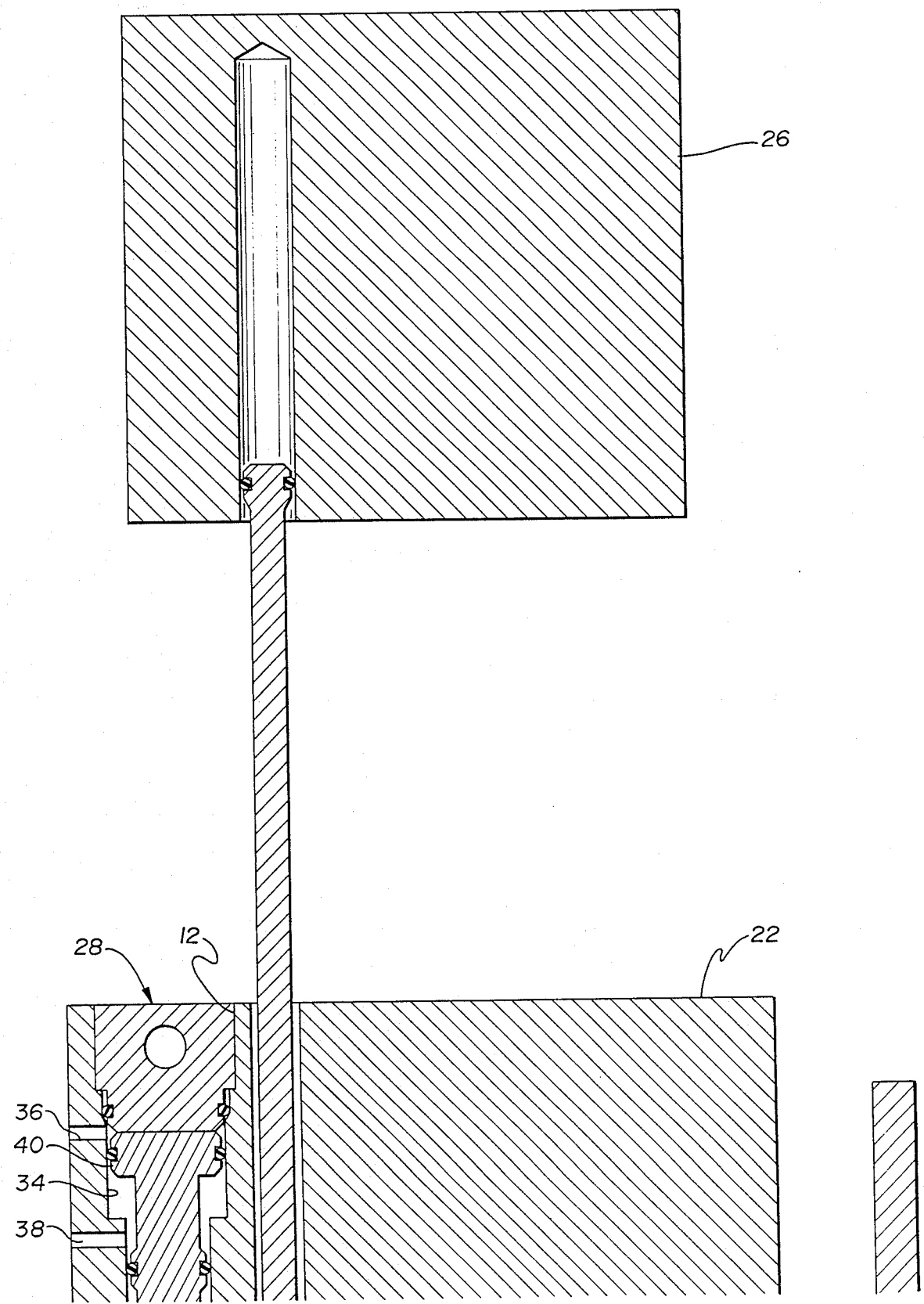
Figure 3B:
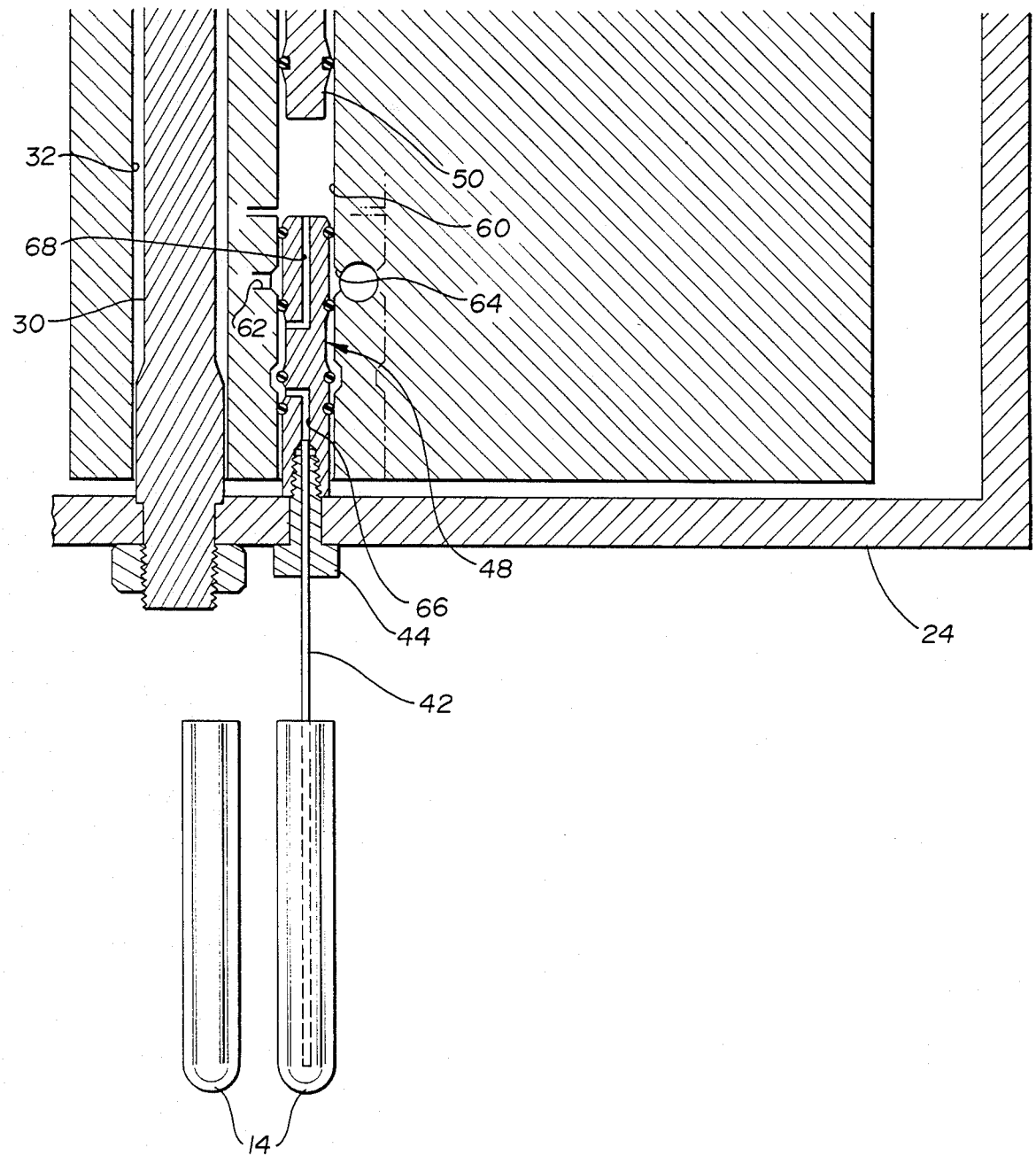

Referring to FIGS. 3a and 3b pump mounting head 22 is shiftably carried on pump mounting head carrier 24 by pump valve actuating mechanism 28. The valve actuating mechanism 28 includes piston rod 30 fixedly attached to pump mounting head carried 24. The piston rod 30 is shiftably received within cylinder 32. Cylinder 32 includes pressure chamber 34. Valving fluid actuating channels 36, 38 are oriented in fluid communication with pressure chamber 34 and are adapted for connection to a source of actuating fluid (not shown). Piston head 40 of piston rod 30 is shiftably received within pressure chamber 34 of cylinder 32. A plurality of nozzle assemblies 42 are detachably secured to the pump mounting head carrier 24 by securing bolts 44.

Each pump 12 broadly includes pump sleeve 46, valving spool 48, and fluid dispensing piston 50. Valve sleeves 48 may be advantageously bored from a common sleeve casing 52. Each valve spool 48 is detachably mounted to the pump mounting head carrier 24 by a nozzle securing bolt 44. Sleeve casing 52 is fixedly carried by pump mounting head 22 such that each pump sleeve 46 is shiftable relative to its respective valving spool 48 by the action of pump valve actuating mechanism 28.

Each fluid dispensing piston 50 includes a lower fluid dispensing piston half 54 carried within pump sleeve 46, and an upper fluid dispensing piston half 56 shiftably carried within piston head 26. Piston support guide 58 is carried by the pistons 50 at the junction of the piston upper and lower halves, with the piston support guide 58 being shiftably carried by guide rods 20.

Each pump sleeve 46 defines an internal pump cylinder 60, and includes a fluid inlet port 62 adapted for fluid communication between respective pump cylinders 60 and a source of fluid to dispensed (not shown). The pump cylinder internal diameter, generally uniform throughout, is slightly increased in the vicinity of the inlet port 62 to define an annular inlet chamber 64. The pump cylinder internal diameter is also slightly increased at a point below the inlet chamber 64 to define a fluid outlet path chamber 65.

Each respective valving spool 48 is shiftably received within its respective cylinder 60. Each valving spool 48 includes nozzle channel 66 and outlet channel 68. The nozzle channels 66 include a respective axial portion 70, and a respective uppermost radial portion 72. Each of the respective outlet channels 68 includes an axial portion 74 and a lowermost radial portion 76. The otherwise generally uniform valve spool outer diameter is reduced in the vicinity of the radial channels 72, 76. The spool midportion 77 interposed between radial channels 72, 76 is not reduced, so as to form a shiftable seal between the valve spool and the portions of pump cylinder 60 other than inlet chamber 64 and fluid outlet path chamber 65. Sealing O-ring 78, 80, 82, 84 are carried by each valving spool 48.

Guide rods 20 are threadably received within bracket 18. Each rod 20 includes cylindrical guide surface 86 and lowermost, enlarged stop member 88. The lower piston half 54 carries sealing O-ring 90, and the upper piston half 56 carries sealing O-ring 92. Inlet port 94 of piston head 26 is provided for coupling the piston cylinders 96 of piston head 26 to a source of pressurized air (not shown). Vent ports 98 are provided in each pump sleeve 46, and are normally sealed closed by set screws 100.

Figure 1A:
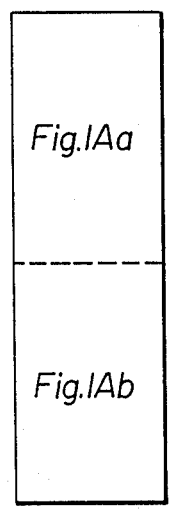
Figure 2:
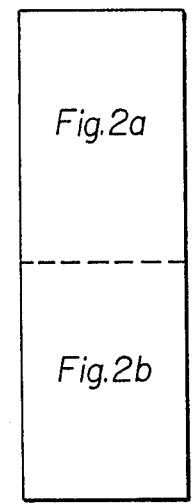
FIGS. 2a and 2b combine as shown in FIG. 2 to present a fragmentary, sectional, front elevation view of a fluid dispensing apparatus in accordance with the present invention oriented in a lowered position, with the valving spools oriented for fluid discharge.
Figure 3:
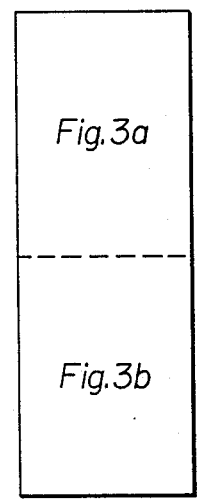
FIGS. 3a and 3b combine as shown in FIG. 3 to depict a fragmentary, sectional, side elevation view of the fluid dispensing system in accordance with the present invention with the valving actuating mechanism shown in cross section, phantom lines depicting a possible location for an additional pump sleeve.
Figure 1A:
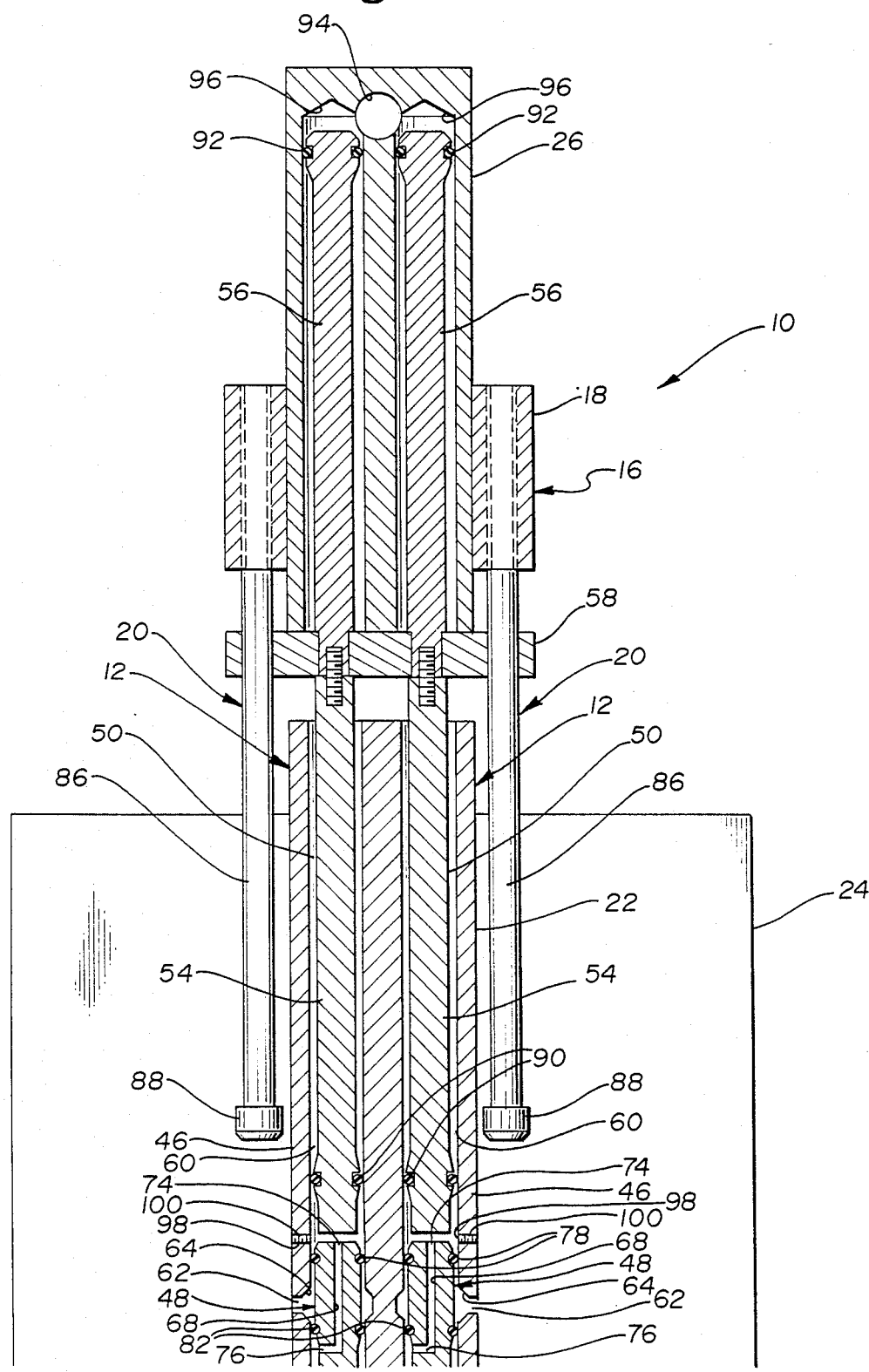
Figure 1A:
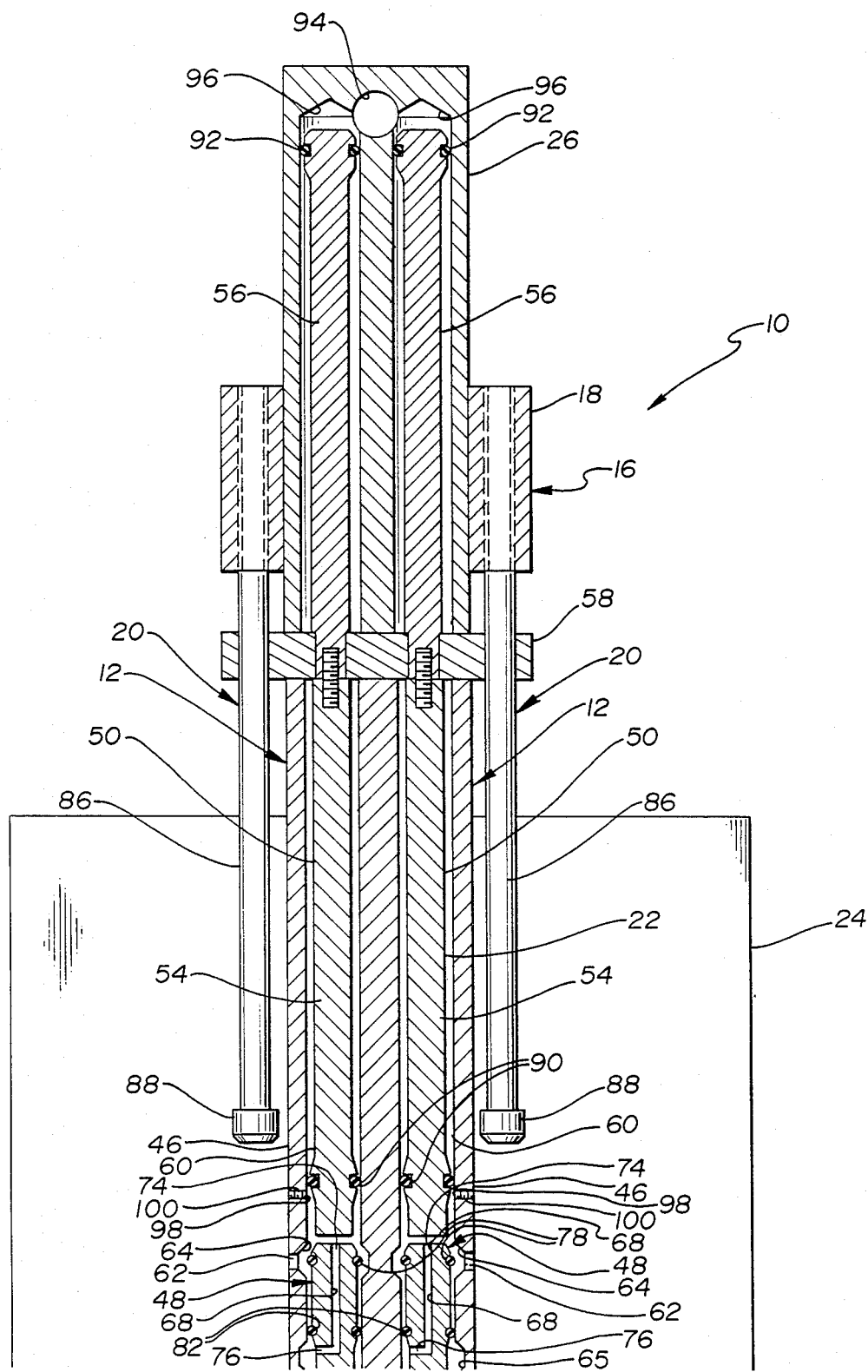
Figure 1B:
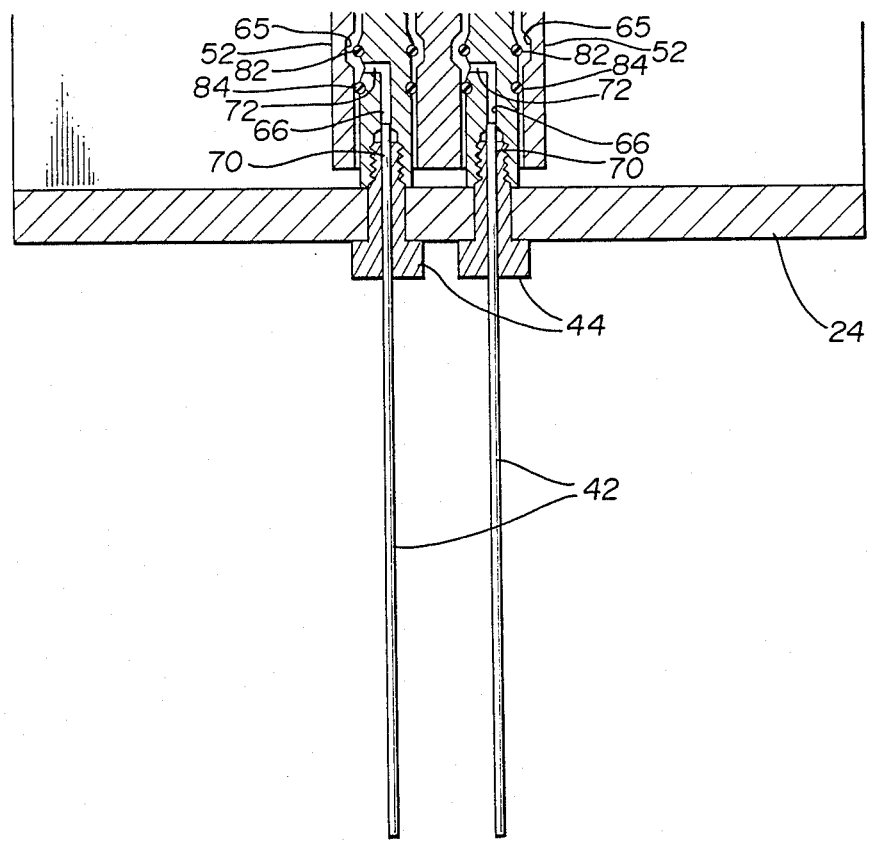
Figure 1B:
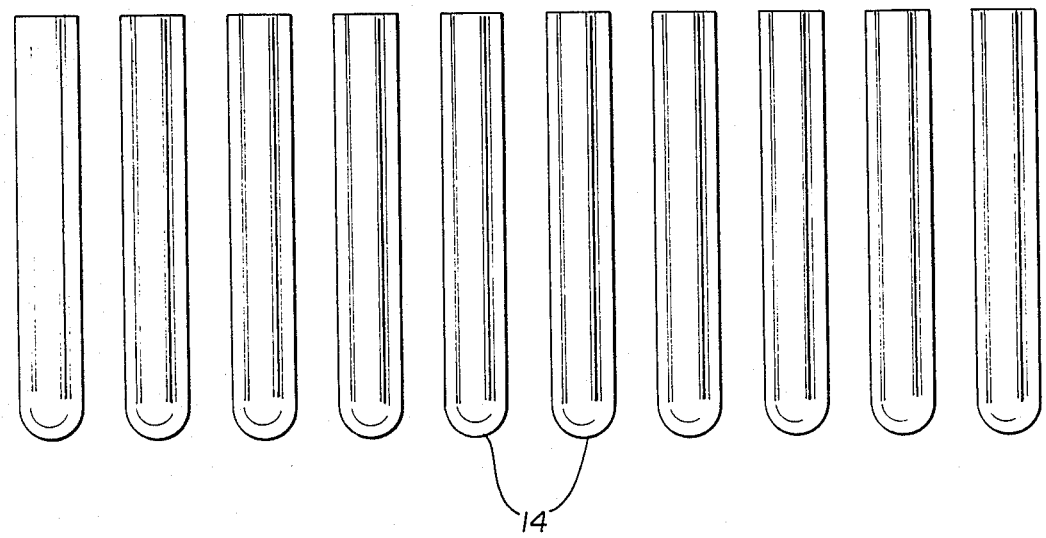
Figure 1A:
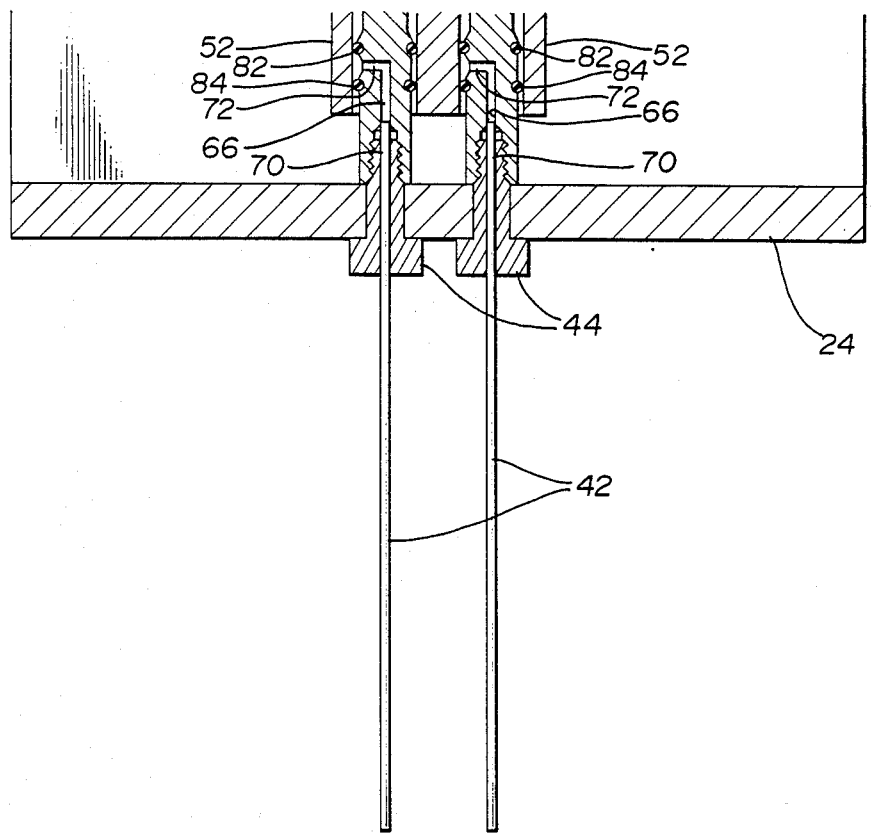
Figure 1A:
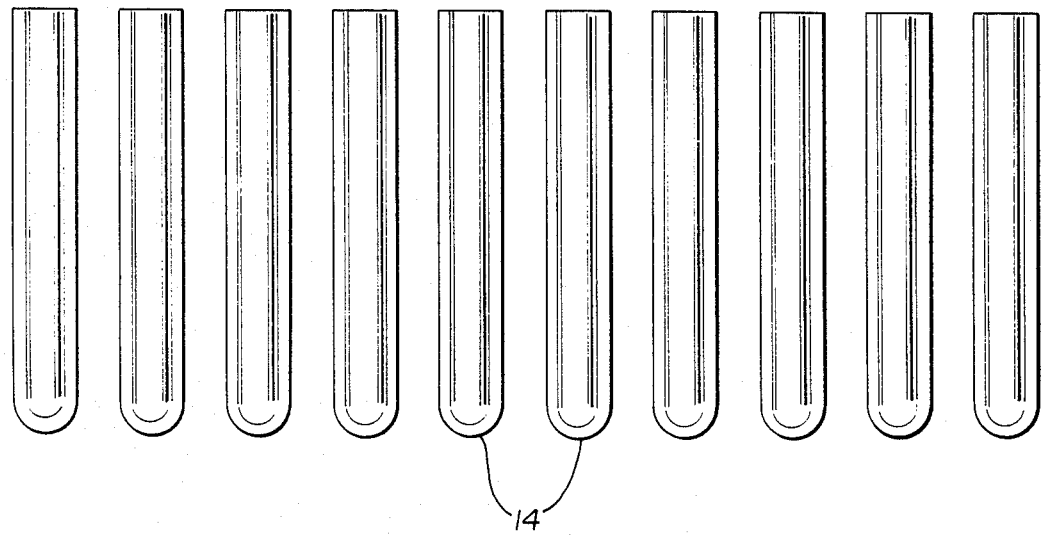

The operational cycle of the fluid dispensing apparatus 10 begins with the apparatus 10 in the configuration of FIGS. 1a and 1b, oriented in a raised position over vials 14. Pump mounting head carrier 24 is shifted from the position shown in FIGS. 1a and 1b to a lowered position relative to pump mounting head 22 as depicted in FIGS. 1a and 1b by shifting the piston rod 30 downwardly within cylinder 32. With reference to FIGS. 1Aa and 1Ab, the downward shifting of carrier 24 causes the valving spools 48 to be shifted downwardly within respective cylinders 60 such that sealing rings 82, 84 are held below respective nozzle chambers 65 in fluid tight relationship with the sidewall of respective cylinders 60. Fluid communication between each respective nozzle channel 66 and inlet channel 76 is thereby effectively blocked. Also with reference to FIGS. 1Aa and 1Ab, it will be seen that, with the valving spools 48 in the lowered position, each seal 78 of respective valving spools 48 is lowered into the annular inlet chamber 64 of respective cylinders 60, allowing for fluid communication between respective inlet ports 62 and cylinders 60.

Once the apparatus 10 is configured as shown in FIGS. 1Aa and 1Ab with valving spools 48 shifted downwardly within sleeves 60, the entire pump mounting head 22 is lowered towards the vials 14 such that nozzles 42 enter the particular vials 14 to be filled during the cycle. Piston cylinders 96 are pressurized by a source of pressurized air connected to piston inlet cylinder ports 94, biasing the fluid dispensing pistons 50 downwardly. The fluid dispensing pistons 50 will continue downwardly until such time that the piston support guide 58 abuts against stop members 88 of guide rods 20. The continued downward motion of pump mounting head 22, once the downward motion of the fluid dispensing pistons 50 has been arrested, causes the lower piston halves 54 of dispensing pistons 48 to move upwardly within pump cylinders 60 thereby drawing fluid into the pump cylinder 60 through inlet ports 62. It will be appreciated that the effective stroke length of each lower piston half 54 within respective pump sleeves 46 (and accordingly the amount of fluid drawn each cycle into respective pump cylinders 60) can be adjusted by threadably shifting the guide rods 20 up and down within brackets 18.

Figure 2A:
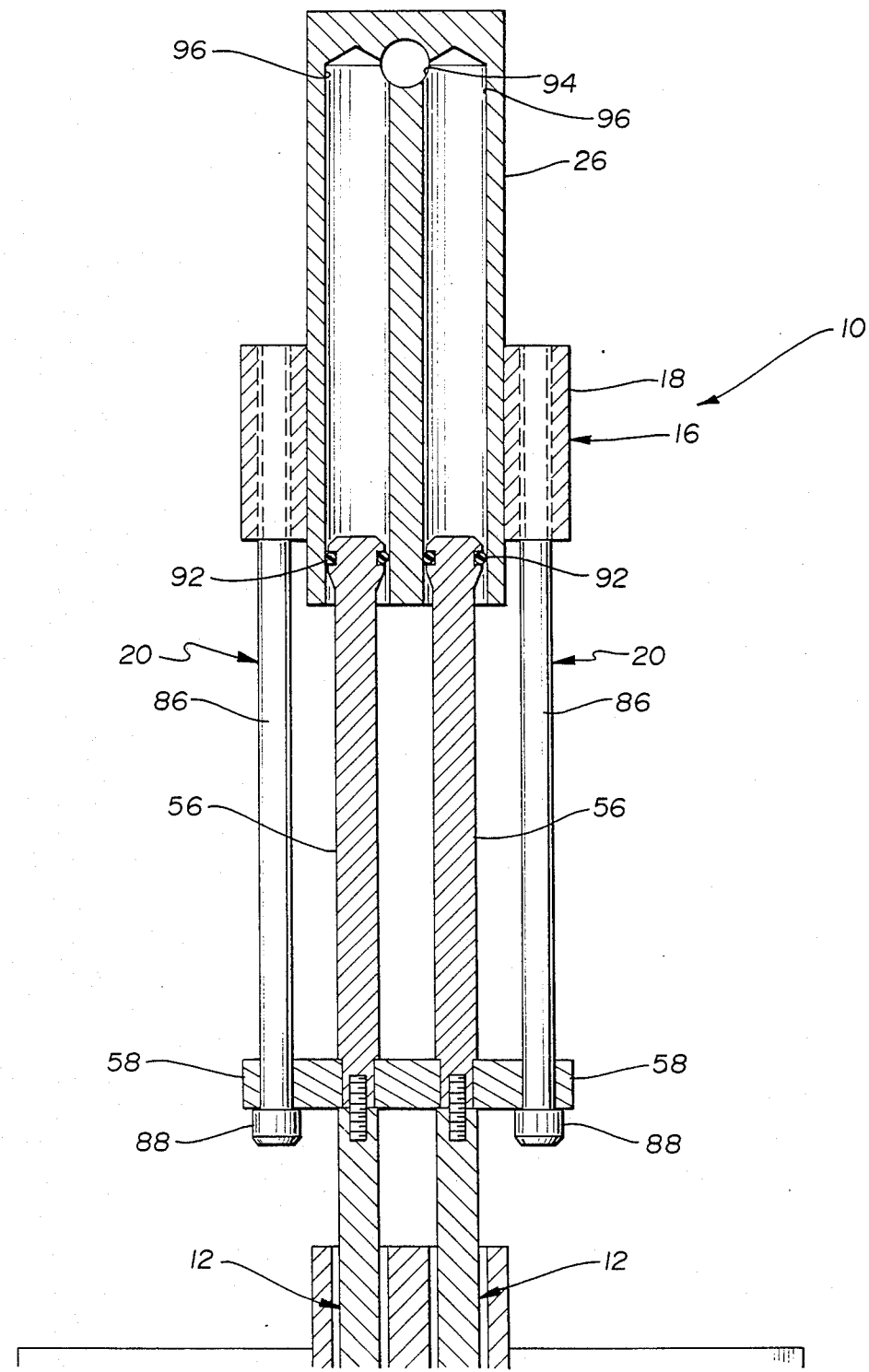
Figure 2B:
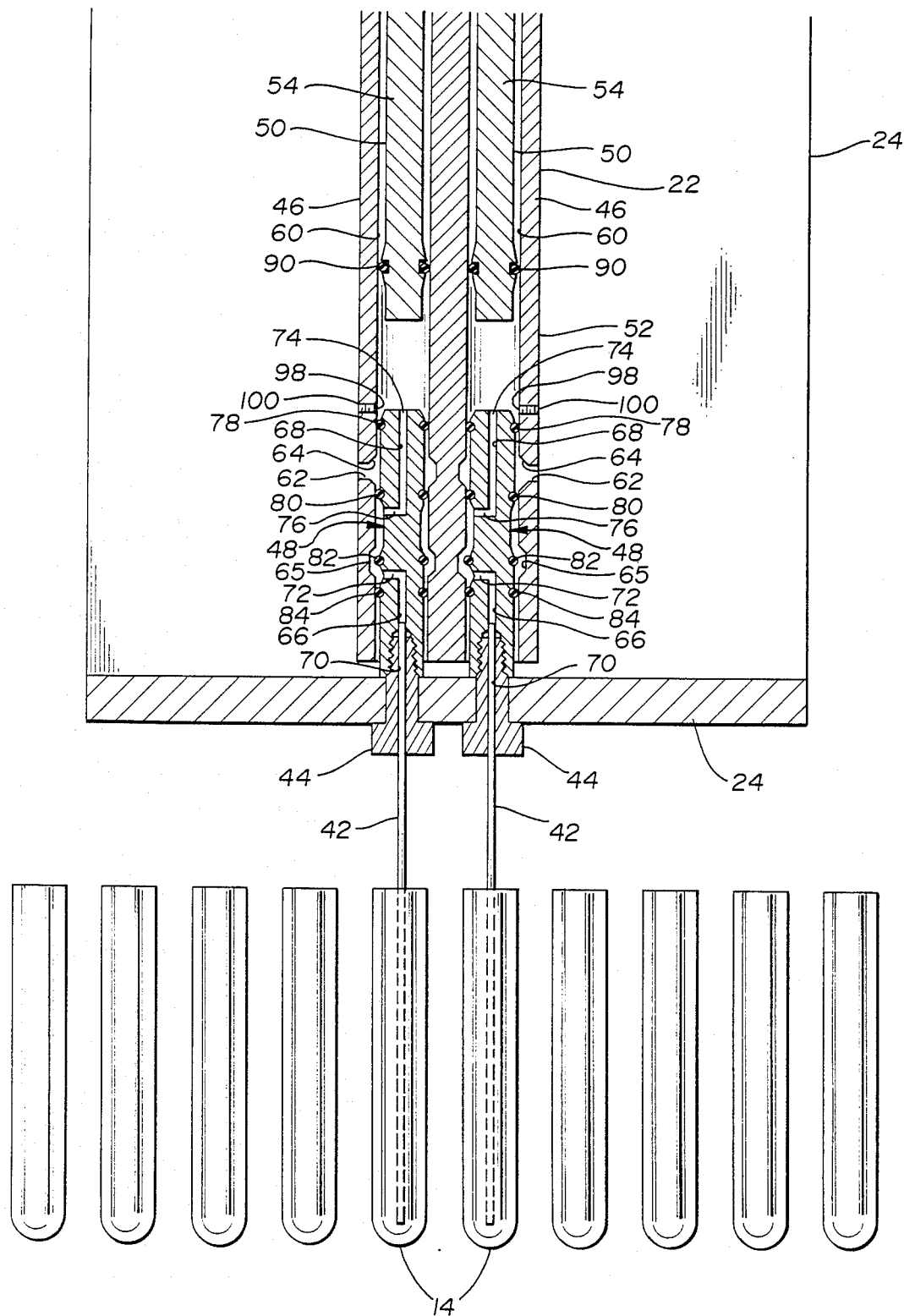

The next step in the operation of apparatus 10 is to shift the pump mounting head carrier 24 upwardly relative to the mounting head 22, as is depicted in FIGS. 2a and 2b. As can be seen from FIGS. 2a and 2b, valving spools 48 are thereby shifted upwardly within cylinders 60 such that fluid communication is established between respective outlet channels 68 and nozzle channels 66. At the same time, seals 78 and 80 effectively isolate respective inlet ports 62 from fluid communication with cylinder 60.

Once the apparatus 10 has been configured as depicted in FIGS. 2a and 2b, the pump mounting head 22 is shifted upwardly, retracting the nozzles 42 from the vials 14. It will be remembered that a downward biasing force is placed on the fluid dispensing pistons 50 due to the pressurization of piston cylinder chambers 96. As the pump head 22 is moved upwardly, therefore, the fluid dispensing pistons 50 are effectively shifted downwardly within pump cylinders 60, forcing the fluid within pump cylinders 60 through respective outlet channels 68, nozzle channels 66, with the fluid ultimately exiting the nozzles 42 into vials 14. Note from the drawings that the diameter of the vials 14 is approximately equal to the internal diameter of the cylinders 60. The height of liquid within vials 14 will therefore correspond directly to the distance the pump head 22 has been raised, keeping the tips of nozzles 14 a constant distance from the surface of the liquid within vials 14.

The uppermost ends of valving spools 48 contact the lowermost ends of pistons 50 once the piston head 22 has been raised high enough, with the upward motion of pump mounting head 22 overcoming the downward biasing force presented to the fluid dispensing pistons 50. In this regard, it will be appreciated that the source of pressurized air is typically regulated, such that the force applied by the pressurized air on the pistons 50 is constant regardless of the height of piston 50. It will be appreciated that all of the fluid to be dispensed into respective vials 14 will have been expelled from cylinder 60 at the time that the valving spools 48 contact respective pistons 50. Once the mounting head 22 has been fully raised, system 10 can be repositioned to the reconfiguration of FIG. 1Aa and 1Ab to commence a second pumping cycle.

A second embodiment of a pump 200 in accordance with the present invention is depicted in FIGS. 4, 5 and 6. While a single pump is depicted in each of FIGS. 4, 5 and 6, it will be understood that several pumps 200 may be grouped in a total system similar to that depicted in FIGS. 1-3. The pump 200 broadly includes pump sleeve 202, valving spool 204 fixedly positioned on valving spool carrier 206, and dispensing piston 208.

Pump sleeve 202 defines internal pump cylinder 210. The pump cylinder 210 is divided into a first, upper, fluid receiving chamber 212 and a second, lower, nozzle chamber 214. The diameter of nozzle chamber 214 is larger than the diameter of the fluid receiving chamber 212. Inlet port 216 is channeled through pump sleeve 202 and is adapted for coupling to a source of fluid to be dispensed. Dispensing piston 208 is shiftably received within fluid receiving chamber 212. The valving spool 204 is shiftably received within the pump internal cylinder 210.

Valving spool 204 defines a lowermost, nozzle channel 218, and an uppermost inlet/outlet channel 220. The nozzle channel 218 includes axial portion 222 and radial portion 224. The inlet/outlet channel 222 includes axial portion 226 and radial portion 228. The valving spool outer diamter is reduced in the areas proximal to the radial channels 228 and 224. The portion 230 of the valving spool 204 between the radial portion 224 of nozzle channel and the radial portion 228 of inlet/outlet channel 220 is of a diameter that enables a fluid tight seal between the portion 230 and the fluid receiving chamber 212 of pump sleeve internal cylinder 210.

Valving spool carrier 206 includes lower, support arm 232, upper, stroke limiting arm 234, and connecting arm 236 extending between and connecting the arms 232, 234 in predetermined spacial relationship.

Operation of the second embodiment of a pump 200 in accordance with the present invention can best be understood by examining the sequence of pump configurations depicted in FIGS. 4, 5 and 6. FIG. 4 depicts the pump sleeve 202 in a lowered position relative to valving spool carrier 206, with the lowermost end of sleeve 202 abutting against support arm 232 of valving spool carrier 206. In the position depicted in FIG. 4, the portion 230 of valving spool 204 forms a liquid tight seal between the nozzle chamber 214 and fluid receiving chamber 212 of pump cylinder 210. The reduced valving spool outer diameter in the area proximal to radial channel 228 of the inlet/outlet channel 220 allows for free fluid communication between the inlet port 216 and a portion of the fluid receiving chamber 212 above the valving spool 204. Retraction (but not removal) of piston 208 from the fluid receiving chamber 212 of pump sleeve 202 will cause the volume of the fluid receiving chamber 212 in fluid communication with the inlet port 216 to expand, thereby drawing fluid into pump sleeve 202.

Once fluid has been drawn into chamber 212 of pump sleeve 202 as described above, pump 200 is configured as shown in FIG. 5. In particular, valving spool carrier 206 is shifted downwardly relative to pump sleeve 202, thereby shifting the position of valving spool 204 within pump sleeve 202. The uppermost portion of valving spool 206 forms a fluid tight seal with fluid inlet port 216, preventing fluid commmunication between fluid receiving chamber 212 and inlet port 216. At the same time, portion 230 of valving spool 204 is shifted out of the fluid receiving chamber 212, and into the larger diameter nozzle chamber 214. Fluid communication is thereby established between the fluid receiving chamber 212, through inlet/outlet channel 220, into nozzle chamber 214, and through nozzle channel 218. Shifting of the piston 218 from the position shown in FIG. 5 to the lowered position shown in FIG. 6 applies pressure to the fluid received within the fluid receiving chamber 210, expelling the fluid through the above described path of fluid communication.

Referring to FIGS. 7 and 8, a third embodiment of a pump 300 in accordance with the present invention is depicted. While a single pump is depicted in each of FIGS. 7 and 8, it will again be understood that several pumps 300 may be grouped in a total system similar to that depicted in FIGS. 1-3.

The pump 300 broadly includes pump sleeve 302, valving spool 304 carried by valving spool carrier 306, and dispensing piston 308. The pump sleeve 302 is comprised of sleeve casing 310 and sleeve lining 312. Sleeve lining 312 comprises spacer tubes 314, 316, 318, 320, 322 and sealing rings 324, 326, 328, 330 and 332. Sleeve casing 310 includes inlet port 334 adapted for coupling to a source of fluid to be dispensed (not shown).

Valving spool 304 includes lowermost nozzle channel 336, and upper, inlet/outlet channel 338. The nozzle channel 336 includes axial channel 340 and radial channel 342. The inlet/outlet channel 338 includes axial channel 344, and upper and lower radial channels 346, 348. The outer diameter of valving spool 304 is reduced in the vicinity of the radial channel 342 of the nozzle channel 336, and the upper and lower radial channels 346, 348 of inlet/outlet channel 338. The outer diameter of the portion 350 of valving spool 304 located between radial channel 348 and radial channel 342 is large enough so as to create a liquid tight seal with sealing O-ring 326 (as in FIG. 7), but is small enough so as to form a liquid communicating channel between itself and spacer tube 314 (as in FIG. 8). The outer diameter of portion 352 of valving spool 306 located below radial channel 342 is slightly less than the outer diameter of valving spool portion 350.

Operation of the pump 300 is best understood by comparing the separate configurations of the pump 300 depicted in FIGS. 7 and 8. Referring first to FIG. 7, valving spool carrier 306 is oriented in the raised position relative to pump sleeve 302 such that upper and lower radial channels 346, 348 of inlet/outlet channel 338 of valving spool 304 are positioned in fluid communicating orientation with inlet port 334. Fluid communication between the inlet/outlet channel 338 and the nozzle channel 342 is blocked by the seal presented by sealing O-ring 326 abutting portion 350 of the valving spool 306. It will be appreciated that raising of the piston 308, when the valving spool and pump sleeve 302 are configured as in FIG. 7, will draw fluid through the inlet port 334 into the portion of the pump sleeve inner chamber located above the seal formed by sealing ring 326 and portion 350 of valving spool 304.

Once fluid has been drawn through the inlet port 334 as described above, valving spool carrier 306 is lowered to the position depicted in FIG. 8. Fluid communication between the inner chamber of pump sleeve 302 and the inlet port 334 is blocked by the seal created between the upper portion of valving spool 304 and seals 328, 330. At the same time, fluid communication is established between inlet/outlet channel 338 and nozzle channel 336 by lowering portion 350 of valving spool 304 below the sealing ring 326. Downward shifting of piston 308, with the valving spool 304 and pump sleeve 302 oriented as depicted in FIG. 8, will force fluid within the chamber of pump sleeve 302 through inlet/outlet channel 338 and nozzle channel 336 for dispensing of the fluid from the pump 300.

I claim:

1. A fluid pump, comprising:
   a sleeve member defining an internal, generally cylindrical pump cylinder having opposed cylinder ends and structure defining an inlet port interposed between said cylinder ends;
   a valving spool received through one of said cylinder ends, said valving spool including first and second, axially spaced apart channels therein;
   first sealing means carried within said cylinder for selectively sealing said inlet port from fluid communication with said cylinder;
   second sealing means carried within said cylinder for selectively sealing said first channel from fluid communication with said second channel;
   piston means receivied through said cylinder end opposed to the cylinder end through which said valve spool is received for selectively, alternatively drawing fluid into and expelling fluid from said pump cylinder; and
   valve actuating means for shifting said sleeve member and said valving spool between a first position wherein said first sealing means clears said inlet port and said second sealing means seals fluid communication between said first and second channels, and a second position wherein said first sealing means seals said inlet port from fluid communication with said cylinder and said second sealing means clears said first and second channels for fluid communication therebetween.

2. The invention as claimed in claim 1, said pump including means for shifting said sleeve member and said piston means along a first path of travel, means for restricting the travel of said piston means along said first path of travel relative to the travel of said sleeve member such that said fluid is drawn into said cylinder as said sleeve member continues along said path of travel while said piston means is restricted, and means for biasing said piston means in the direction of said first path of travel whereby fluid is expelled from said cylinder as said sleeve member is shifted in a second path of travel opposite in direction to said first path of travel.

3. The invention as claimed in claim 1, said valving spool and said pump cylinder presenting a fluid communicating clearance therebetween, said first sealing means comprising means for presenting a first fluid tight seal across said fluid communicating clearance adjacent said inlet port when said sleeve member and said valving spool are in said second position.

4. The invention as claimed in claim 3, said valving spool presenting a first seal defining portion having a first spool diameter, said cylinder presenting an inner cylinder sidewall having a first sidewall portion adjacent said inlet port having a first cylinder sidewall portion diameter, said first spool diameter and said first cylinder sidewall portion diameter being substantially equal, said means for presenting said first fluid tight seal comprising said valving spool first seal defining portion.

5. The invention as claimed in claim 4, said means for presenting a first port fluid tight seal further comprising an elastomeric sealing member operably carried by said valving spool first seal defining portion.

6. The invention as claimed in claim 4, said second sealing means comprising means for presenting a second fluid tight seal across said fluid communicating clearance between said first and second channels when said sleeve member and said valving spool are in said first position.

7. The invention as claimed in claim 6, said valving spool presenting a second seal defining portion interposed between said first and second channels and having a second spool diameter, said cylinder sidewall having a second sidewall portion oriented adjacent said valving spool second seal defining portion when said sleeve member and said valving spool are in said first position, said second sidewall portion presenting a second sidewall diameter, said second spool diameter and said second cylinder sidewall portion diameter being substantially equal, said means for presenting a second fluid tight seal comprising said valving spool second seal defining portion.

8. The invention as claimed in claim 7, said means for presenting a second fluid tight seal further comprising an elastomeric sealing member operably carried by said valving spool second seal defining portion.

9. The invention as claimed in claim 3, said fluid communicating clearance including first and second, axially spaced apart chambers, said first and second chambers being aligned in fluid communicating relationship and said first sealing means isolating said first chamber from said cylinder when said sleeve member and said valving spool are in said second position.

10. The invention as claimed in claim 3, said fluid communicating clearance including first and second, axially spaced apart chambers, said first chamber and said cylinder being aligned in fluid communicating relationship, and said second sealing means isolating said first chamber from said second chamber when said sleeve member and said valving spool are in said second position.

11. The invention as claimed in claim 9, said first chamber comprising structure defining a recess on said valving spool.

12. The invention as claimed in claim 10, said first chamber comprising structure defining a recess on said valving spool.

13. The invention as claimed in claim 9, said second chamber comprising structure defining a recess in said cylinder.

14. The invention as claimed in claim 10, said second chamber comprising structure defining a recess in said cylinder.

* * * * *